April 26, 1932.  H. A. LINDENSCHMITT  1,855,299
MEAT BLOCK SCRAPER
Filed Dec. 31, 1930
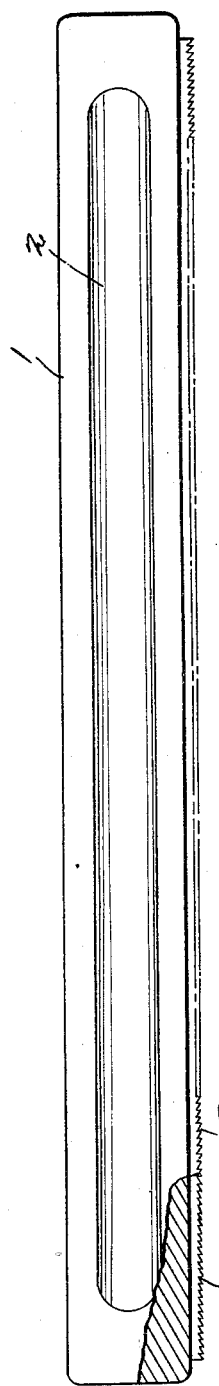
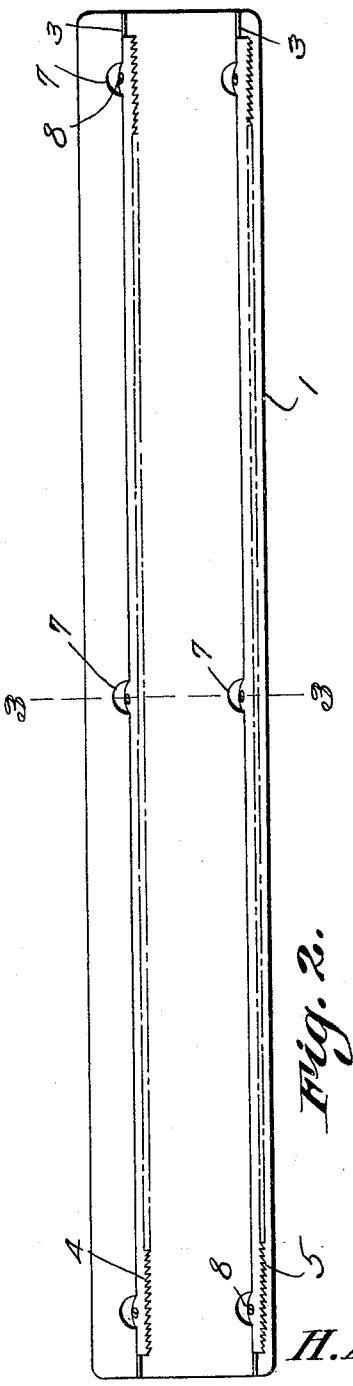
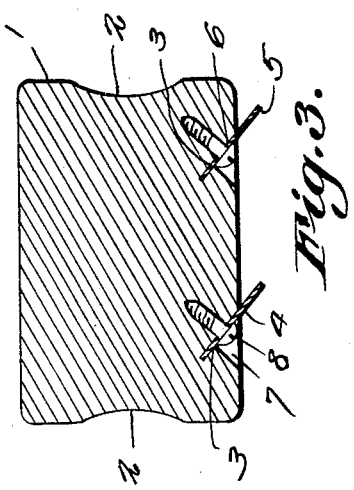
Inventor
H. A. Lindenschmitt
By Chrow&Co.
Attorneys.

Patented Apr. 26, 1932

1,855,299

UNITED STATES PATENT OFFICE

HENRY A. LINDENSCHMITT, OF GRAND JUNCTION, COLORADO

MEAT BLOCK SCRAPER

Application filed December 31, 1930. Serial No. 505,888.

This invention relates to a scraper for meat blocks, one of its objects being to provide a simple and efficient scraper having toothed blades which can be replaced or sharpened at will.

Another object is to provide a scraper which is cheap to manufacture and will operate efficiently.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings, the preferred form of the invention has been shown.

In said drawings:

Figure 1 is a front elevation of the scraper, a portion being broken away.

Figure 2 is a bottom view thereof.

Figure 3 is an enlarged section on line 3—3, Figure 2.

Referring to the figures by characters of reference, 1 designates an elongated block of wood or other suitable material having longitudinal recesses 2 in opposed faces whereby the block can be grasped readily by the hands of the used.

Formed in the bottom face of the block are parallel longitudinal slits 3 which are obliquely disposed relative to the bottom surface of the block. Each of these slits is adapted to receive the back edge portion of a saw blade 4. The teeth 5 of the saw blade are thus supported in an inclined plane beyond the bottom surface of the block as shown. Each saw blade has openings 6 which register with recesses 7 cut into the bottom of the block at suitable points. Thus screws 8 can be inserted into the openings 6 and forced into the block 2, the heads of the screws being seated in the recesses 7. Consequently the blades will be held against displacement relative to the block.

It is preferred to have the teeth on one of the blades pitched oppositely to the teeth on the other blade. Thus when the scraper is drawn over the surface to be cleaned, one set of teeth will act oppositely to the other set and the resultant cleaned surface will be of greater smoothness than would otherwise be possible.

The scraper is used by grasping in one or both hands and then drawing it with a lateral sweeping motion over the surface of the meat block. The teeth will bite into and scrape the surface and thereby quickly clean it.

Should either or both of the blades become broken or worn the same can be removed readily and others substituted. The blades can also be easily removed for sharpening.

It is designed to use in the block ordinary hack saw blades which are obtainable readily from dealers in hardware.

What is claimed is:

A scraper of the class described including an elongated block adapted to be grasped by the user, said block having inclined slits extending in parallel planes within and longitudinally of the bottom face of the block, blades seated in the respective slits and having toothed edges projecting from the bottom face of the block, the lower walls of the slits being provided with recesses at the edge thereof, and fastening devices having heads seated in the recesses, said devices being extended through the blades and into the block and located entirely above the bottom plane of the block, the fastening devices of each blade being removable without disturbing the fastening devices of the other blade, the teeth on each blade being pitched oppositely to the teeth on the other blade.

In testimony that I claim the foregoing as my own, I have hereto affixed my signature.

HENRY A. LINDENSCHMITT.